US009629137B2

(12) United States Patent
Kim et al.

(10) Patent No.: US 9,629,137 B2
(45) Date of Patent: *Apr. 18, 2017

(54) APPARATUS AND METHOD FOR TRANSMITTING UPLINK CONTROL INFORMATION

(71) Applicant: LG ELECTRONICS INC., Seoul (KR)

(72) Inventors: Ki Jun Kim, Anyang-si (KR); Han Byul Seo, Anyang-si (KR); Eun Sun Kim, Anyang-si (KR); Joon Kui Ahn, Anyang-si (KR); Hak Seong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/234,714

(22) Filed: Aug. 11, 2016

(65) Prior Publication Data

US 2016/0366684 A1    Dec. 15, 2016

Related U.S. Application Data

(63) Continuation of application No. 13/499,273, filed as application No. PCT/KR2010/006622 on Sep. 29, 2010, now Pat. No. 9,432,977.

(Continued)

(51) Int. Cl.
*H04W 72/04* (2009.01)
*H04B 7/06* (2006.01)
(Continued)

(52) U.S. Cl.
CPC ...... *H04W 72/0413* (2013.01); *H04B 7/0626* (2013.01); *H04L 1/1861* (2013.01); *H04W 72/1289* (2013.01)

(58) Field of Classification Search
None
See application file for complete search history.

(56) References Cited

U.S. PATENT DOCUMENTS

2009/0190687 A1  7/2009  Moon et al.
2010/0098012 A1  4/2010  Bala et al.
(Continued)

OTHER PUBLICATIONS

Nortel, "PUSCH Feedback Mode Enhancements", R1-084480, 3GPP TSG-RAN WG1#55, Nov. 2008.*
(Continued)

*Primary Examiner* — John Blanton
*Assistant Examiner* — Thinh Tran
(74) *Attorney, Agent, or Firm* — Lee Hong Degerman Kang Waimey

(57) ABSTRACT

A wireless communication system is disclosed. A method and apparatus for allowing a user equipment (UE) to transmit uplink control information through a physical uplink shared channel (PUSCH) are disclosed. A method for allowing a UE to transmit uplink control information through a PUSCH in a wireless communication system includes receiving configuration information about a plurality of PUSCH feedback modes, identifying information indicating a specific PUSCH feedback mode for the PUSCH by using uplink allocation information for the PUSCH, and transmitting the uplink control information through the PUSCH in accordance with the specific PUSCH feedback mode.

20 Claims, 20 Drawing Sheets

Related U.S. Application Data

(60) Provisional application No. 61/246,991, filed on Sep. 30, 2009, provisional application No. 61/250,858, filed on Oct. 12, 2009, provisional application No. 61/253,481, filed on Oct. 20, 2009, provisional application No. 61/312,637, filed on Mar. 10, 2010.

(51) Int. Cl.
   *H04L 1/18* (2006.01)
   *H04W 72/12* (2009.01)

(56) References Cited

U.S. PATENT DOCUMENTS

| | | | |
|---|---|---|---|
| 2011/0134771 A1* | 6/2011 | Chen | H04L 1/0027 370/252 |
| 2012/0002568 A1* | 1/2012 | Tiirola | H04L 1/0026 370/252 |
| 2012/0188976 A1 | 7/2012 | Kim et al. | |
| 2013/0121287 A1 | 5/2013 | Lunttila et al. | |
| 2014/0254521 A1* | 9/2014 | Fong | H04L 5/0053 370/329 |

OTHER PUBLICATIONS

Nokia Siemens Networks et al., "UL control signalling for carrier aggregation", R1-092572, 3Gpp TSG RAN WG1 Meeting #57bis, Jun. 2009.*

Chen et al. U.S. Appl. No. 61/185,913, "Joint Parameter Determination and Separate CQI Generation Reporting for LTE-A Multicarrier", filed Jun. 10, 2009.*

U.S. Appl. No. 61/172,127, "Method and Apparatus for Utilizing and Configuring Uplink Data Channel for Carrying High Volume and Variable Size WTRU Feedback Information in LTE-Advanced", Apr. 23, 2009.*

Qualcomm Europe, "Summary of email discussions for CoMP," 3GPP TSG-RAN WG1 #56bis, R1-091617, Mar. 2009, 16 pages.

InterDigital, "Analysis of Feedback Mechanisms for CoMP," 3GPP TSG RAN WG1 Meeting #57bis, R1-092585, Jun. 2009, 10 pages.

European Patent Office Application Serial No. 10820824.0, Search Report dated Nov. 5, 2014, 10 pages.

Chen, et al. U.S. Appl. No. 61/185,913, filed Jun. 10, 2009.

U.S. Appl. No. 61/246,061, filed Sep. 25, 2009.

U.S. Appl. No. 61/172,127.

CMCC et al., "CQI reporting for antenna port 5", R1-084673, 3GPP TSG RAN Meeting #55, Nov. 2008.

Sharp, "Control Overhead Analysis on Aperiodic PUSCH", R1-092338, 3GPP TSG-RAN WG1#57bis, Jun. 2009.

Catt, et al., "Design of DL Control Channel for LTE-A with Carrier Aggregation", R1-093530, 3GPP TSG RAN WG1 meeting #58, Aug. 2009, 4 pages.

InterDigital Communications, LLC, "Cross Carrier Operation for Bandwidth Extension", R1-093067, 3GPP TSG-RAN WG1 Meeting #58, Aug. 2009, 6 pages.

* cited by examiner (a) Control-plane protocol stack (b) User-plane protocol stack S: serving cell
N1 : neighboring cell 1
N2 : neighboring cell 2

S: serving cell
N1 : neighboring cell 1
N2 : neighboring cell 2

S: serving cell
N1 : neighboring cell 1
N2 : neighboring cell 2

FIG. 18

| RI (S) | PMI (S) | CQI (S) | PMI (N1) | CQI (N1) | PMI (N2) | CQI (N2) | PCI (N1) | PCI (N2) | RR |

S: serving cell
N1 : neighboring cell 1
N2 : neighboring cell 2

S: serving cell
N1 : neighboring cell 1
N2 : neighboring cell 2

PMI when considering multi-cells
(PMI(MC))

APPARATUS AND METHOD FOR TRANSMITTING UPLINK CONTROL INFORMATION

CROSS-REFERENCE TO RELATED APPLICATIONS

This application is a continuation of U.S. patent application Ser. No. 13/499,273, filed on Mar. 29, 2012, now U.S. Pat. No. 9,432,977, which is the National Stage filing under 35 U.S.C. 371 of International Application No. PCT/KR2010/006622, filed on Sep. 29, 2010, which claims the benefit of U.S. Provisional Application No. 61/246,991, filed on Sep. 30, 2009, 61/250,858, filed on Oct. 12, 2009, 61/253,481, filed on Oct. 20, 2009 and 61/312,637, filed on Mar. 10, 2010, the contents of which are all incorporated by reference herein in their entirety.

TECHNICAL FIELD

The present invention relates to wireless communication, and more particularly, to a method and apparatus for transmitting uplink control information.

BACKGROUND ART

Wireless communication systems have been diversified in order to provide various types of communication services such as voice or data service. In general, a wireless communication system is a multiple access system capable of sharing available system resources (bandwidth, transmission power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and the like.

DISCLOSURE

Technical Problem

An object of the present invention devised to solve the problem lies on a method and apparatus for transmitting uplink control information.

Another object of the present invention devised to solve the problem lies on a method and apparatus for efficiently transmitting uplink control information through a Physical Uplink Shared Channel (PUSCH).

Technical Solution

The object of the present invention can be achieved by providing a method for allowing a user equipment (UE) to transmit uplink control information over a physical uplink shared channel (PUSCH) in a wireless communication system including receiving configuration information about a plurality of PUSCH feedback modes, identifying information indicating a specific PUSCH feedback mode for the PUSCH using uplink allocation information for the PUSCH, and transmitting the uplink control information through the PUSCH in accordance with the specific PUSCH feedback mode.

In another aspect of the present invention, provided herein is a user equipment (UE) for transmitting uplink control information through a physical uplink shared channel (PUSCH) in a wireless communication system, the user equipment (UE) including a radio frequency (RF) unit, and a processor, wherein the processor receives configuration information about a plurality of PUSCH feedback modes, identifies information indicating a specific PUSCH feedback mode for the PUSCH using uplink allocation information for the PUSCH, and transmits the uplink control information through the PUSCH in accordance with the specific PUSCH feedback mode.

The configuration information about the plurality of PUSCH feedback modes may be received through Radio Resource Control (RRC) signaling, and the uplink allocation information may be received through a physical downlink control channel (PDCCH).

The information indicating the specific PUSCH feedback mode may be identified using an index value contained in the uplink allocation information.

The information indicating the specific PUSCH feedback mode may be linked with an index of a resource block (RB) for the PUSCH.

The information indicating the specific PUSCH feedback mode may be linked with a hybrid automatic repeat and request (HARQ) process for the PUSCH.

The information indicating the specific PUSCH feedback mode may be linked with an index of a time interval to which the PUSCH is transmitted.

The uplink control information may include first information indicating a rank during a single-cell operation and second information indicating a rank during a multi-cell operation.

Advantageous Effects

According to embodiments of the present invention, it is possible to efficiently transmit a large amount of uplink control information in a ratio communication system.

DESCRIPTION OF DRAWINGS

The accompanying drawings, which are included to provide a further understanding of the invention, illustrate embodiments of the invention and together with the description serve to explain the principle of the invention.

In the drawings:

FIGS. 15 to 19 are examples of feedback format/structure according to an embodiment of the present invention.

MODE FOR INVENTION

The following technologies may be utilized in various radio access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, or a Single Carrier Frequency Division Multiple Access (SC-FDMA) system. The CDMA system may be implemented as radio technology such as Universal Terrestrial Radio Access (UTRA) or CDMA2000. The TDMA system may be implemented as radio technology such as Global System for Mobile communications (GSM)/General Packet Radio Service (GPRS)/Enhanced Data Rates for GSM Evolution (EDGE). The OFDMA system may be implemented as radio technology such as IEEE 802.11 (Wi-Fi), IEEE 802.16 (WiMAX), IEEE 802-20 or E-UTRA (Evolved UTRA). The UTRA system is part of the Universal Mobile Telecommunications System (UMTS). A 3d Generation Partnership Project Long Term Evolution (3GPP LTE) communication system is part of the E-UMTS (Evolved UMTS), which employs an OFDMA system in downlink and employs an SC-FDMA system in uplink. LTE-A (Advanced) is an evolved version of 3GPP LTE.

In order to clarify the description, the 3GPP LTE/LTE-A will be focused upon, but the technical scope of the present invention is not limited thereto.

Figure 1:
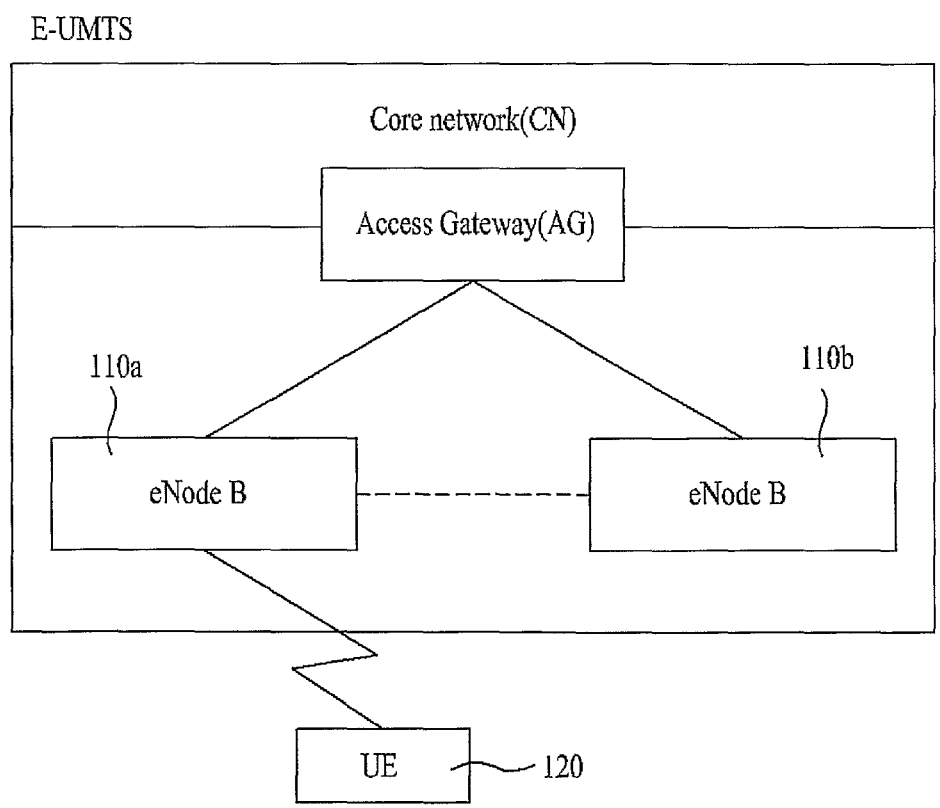
FIG. 1 is a diagram showing a network architecture of an Evolved Universal Mobile Telecommunications System (E-UMTS).

FIG. 1 is a diagram showing a network architecture of an Evolved Universal Mobile Telecommunications System (E-UMTS). The E-UMTS is an evolved version of a WCDMA UMTS and basic standardization thereof is in progress under the 3GPP. The E-UMTS is also referred to as a Long Term Evolution (LTE) system. For details of the technical specifications of the UMTS and the E-UMTS, refer to Release 7 and Release 8 of "$3^{rd}$ Generation Partnership Project; Technical Specification Group Radio Access Network", respectively.

Referring to FIG. 1, the E-UMTS mainly includes a User Equipment (UE) 120, base stations (BSs) (or eNBs or eNode Bs) 110a and 110b, and an Access Gateway (AG) which is located at an end of a network (E-UTRAN) and which is connected to an external network. Generally, the BS can simultaneously transmit multiple data streams for a broadcast service, a multicast service and/or a unicast service. One or more cells may exist for one BS. The cell provides a downlink or uplink transmission service to several UEs using any one of bandwidths of 1.4, 3, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and request (HARQ) associated information of the data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG and a network node or the like for user registration of the UE. The AG manages mobility of a UE on a Tracking Area (TA) basis. One TA includes a plurality of cells.

Figure 2:
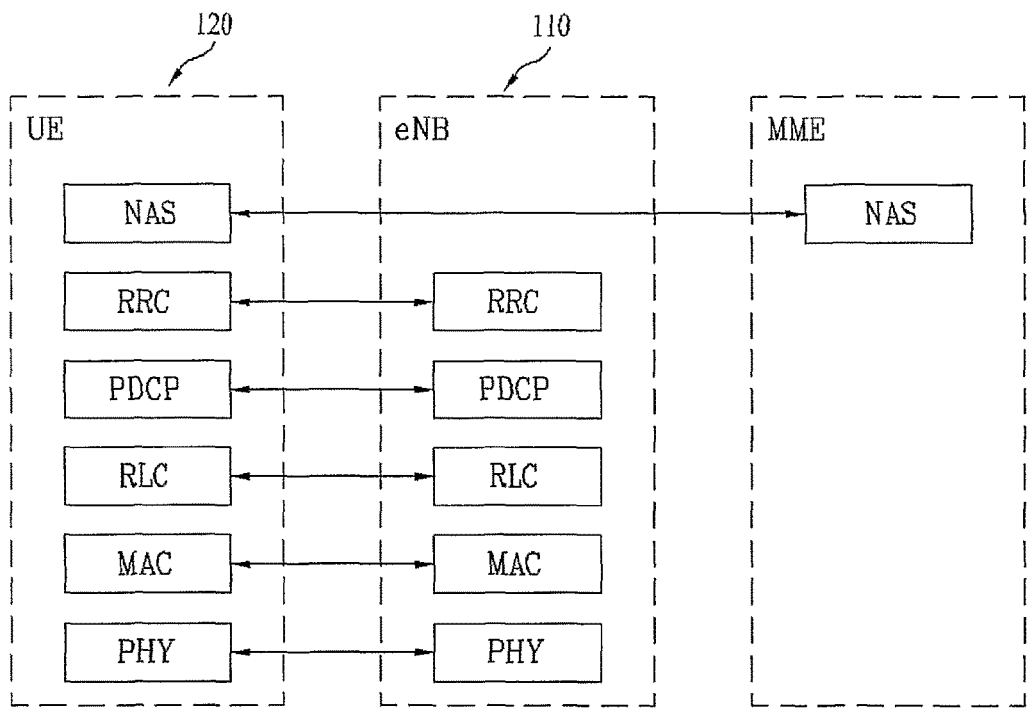
FIG. 2 is a diagram showing a user/control-plane protocol for the E-UMTS.
Figure 2:
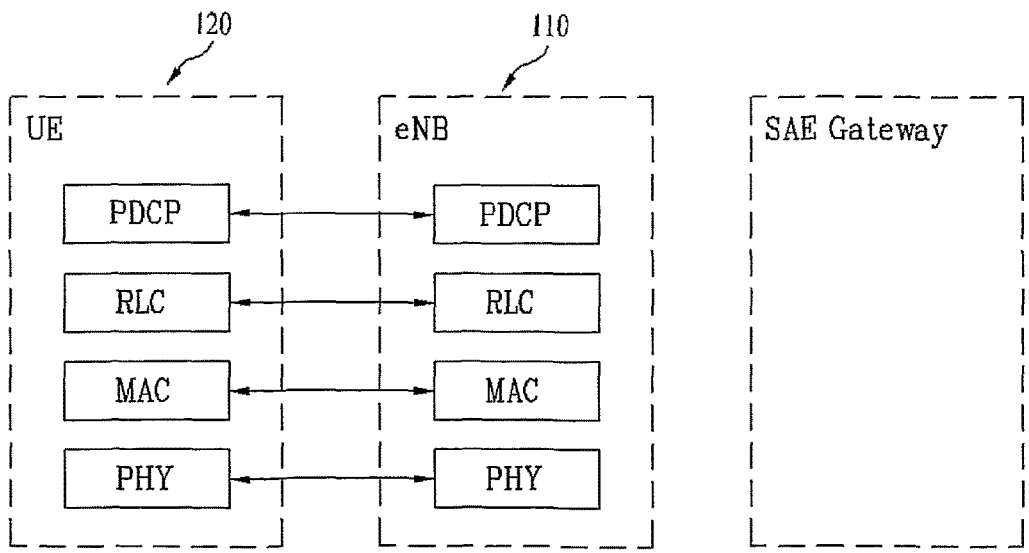

FIG. 2 is a diagram showing a user/control-plane protocol stack for the E-UMTS. Referring to FIG. 2, protocol layers may be divided into a first layer (L1), a second layer (L2) and a third layer (L3) based on the three lower layers of an open system interconnection (OSI) standard model which is well-known in the art of communication systems.

The physical layer PHY, which is the first layer, provides an information transfer service to a higher layer using a physical channel. The physical layer is connected with a medium access control (MAC) layer located at a higher level through a transport channel, and data is transferred between the MAC layer and the physical layer via the transport channel. Data is transferred between physical layers of a transmission side and a reception side via the physical channel.

The MAC layer of the second layer (L2) provides services to a radio link control (RLC) layer, which is a higher layer, via a logical channel. The RLC layer of the second layer (L2) enables reliable data transmission. In the case where the MAC layer performs the RLC function, the RLC layer is included as the functional block of the MAC layer. The PDCP layer of the second layer (L2) performs a header compression function that reduces the size of an Internet protocol (IP) packet header containing unnecessary control information having a relatively large size in order to efficiently transmit the IP packets such as IPv4 or IPv6 packets over a radio interface having a limited bandwidth.

A radio resource control (RRC) layer located at the lowest portion of the third layer (L3) is only defined in the control plane and controls logical channels, transport channels and physical channels in relation to the configuration, reconfiguration, and release of the radio bearers (RBs). Here, the RB signifies a service provided by the second layer (L2) for data transmission between the UE 120 and the E-UTRAN.

Figure 3:
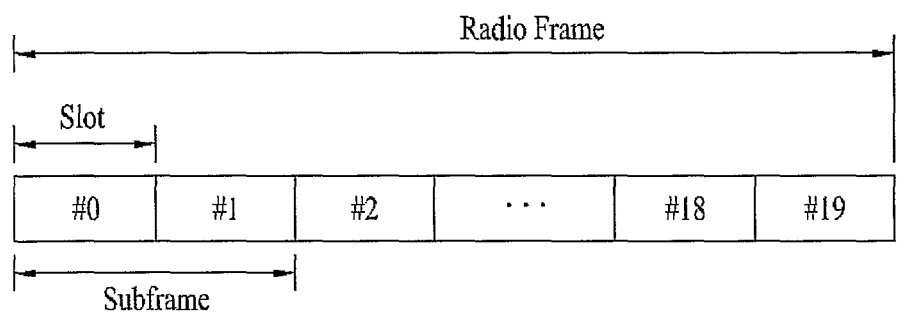
FIG. 3 is a diagram showing the structure of a radio frame used in the E-UMTS.

FIG. 3 is a diagram showing the structure of a radio frame used in the E-UMTS.

Referring to FIG. 3, the E-UTMS uses a 10 ms radio frame and one radio frame includes 10 subframes. In addition, one subframe includes two continuous slots. The length of one slot is 0.5 ms. In addition, the slot includes a plurality of symbols (e.g., OFDM symbols or SC-FDMA symbols).

Figure 4:
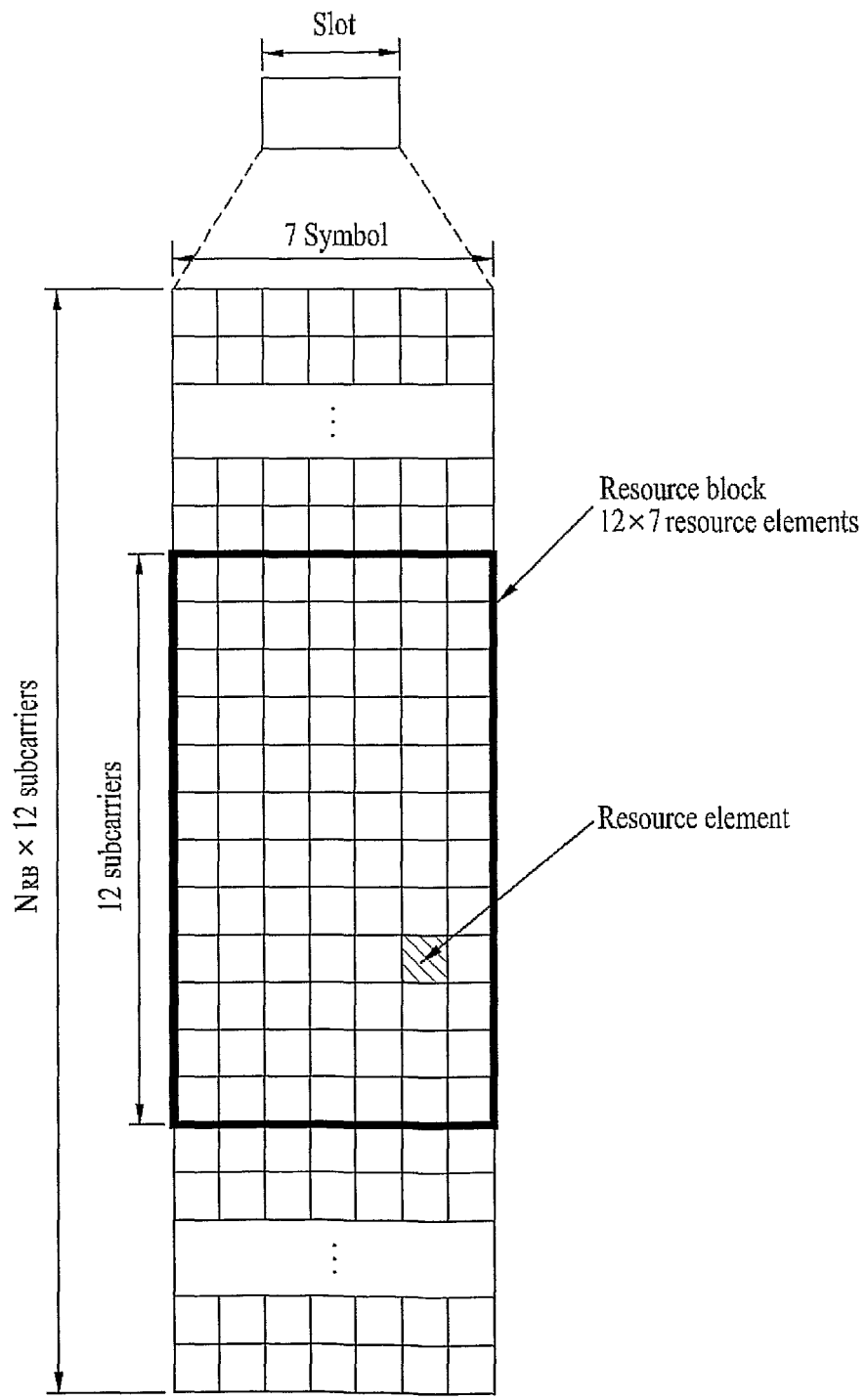
FIG. 4 is a diagram showing a resource grid of a radio frame.

FIG. 4 is a diagram showing a resource grid for a time slot.

Referring to FIG. 4, the time slot includes a plurality of OFDM symbols or SC-FDMA symbols and includes a plurality of Resource Blocks (RBs) in a frequency domain. One RB includes 12×7(6) resource elements. The number of RBs included in the time slot depends on frequency bandwidth set in a cell. Each column of the resource grid indicates minimum resource defined by one symbol and one subcarrier and is referred to as a Resource Element (RE). Although the time slot includes 7 symbols and the RB includes 12 subcarriers, in FIG. 4, the present invention is not limited thereto. For example, the number of symbols included in the time slot may be changed according to the length of a Cyclic Prefix (CP).

Figure 5:
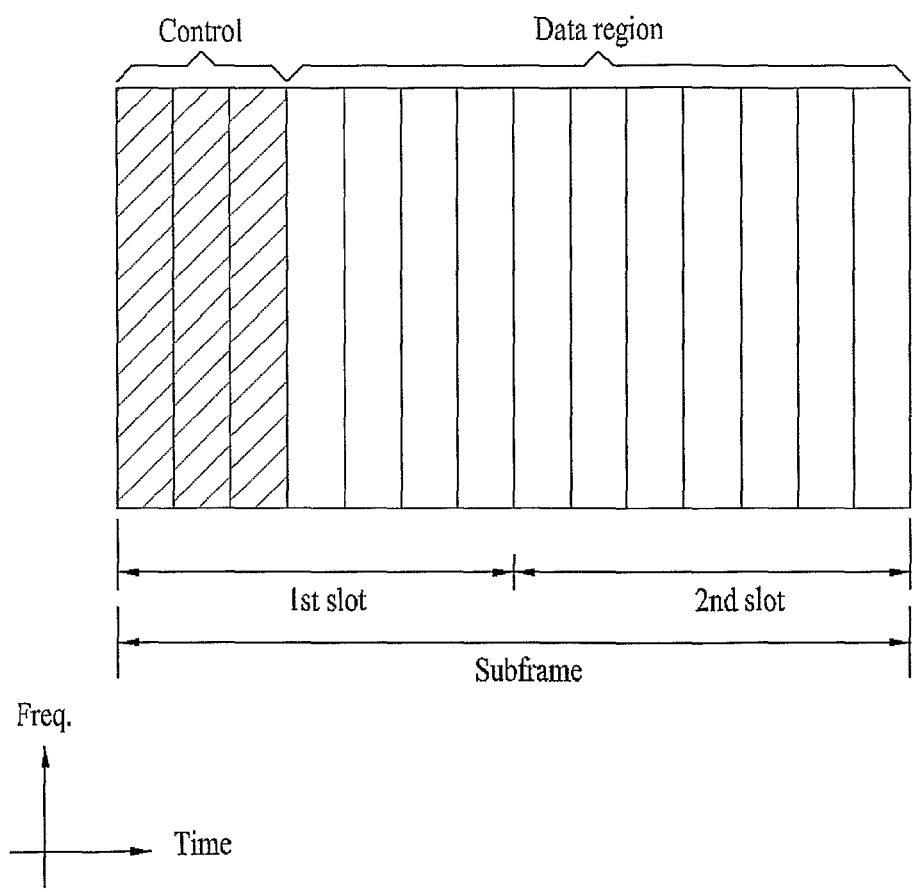
FIG. 5 is a diagram showing the structure of a downlink subframe.

FIG. 5 is a diagram showing the structure of a downlink subframe.

Referring to FIG. 5, in a downlink subframe of an LTE system, an L1/L2 control region and a data region are multiplexed using a Time Division Multiplexing (TDM) method. The L1/L2 control region includes n (e.g., 3 or 4) first OFDM symbols of the subframe and the remaining OFDM symbols are used in the data region. The L1/L2 control region includes a Physical Downlink Control Channel (PDCCH) for carrying downlink control information and the data region includes a Physical Downlink Shared Channel (PDSCH) which is a downlink data channel. In order to receive a downlink signal, a User Equipment (UE) reads downlink scheduling information from the PDCCH and receives downlink data on the PDSCH using resource assignment information indicated by the downlink scheduling information. Resources (that is, PDSCH) scheduled to the UE are assigned in units of resource blocks or resource block groups.

The PDCCH informs the UE of information associated with resource assignment of a Paging Channel (PCH) and a Downlink-Shared Channel (DL-SCH), both of which are transfer channels, uplink scheduling grant, HARQ information and the like. Information transmitted through the PDCCH is generically called Downlink Control Information (DCI). The PDCCH has a format which varies according to information. The DCI format is changed according to control information. Table 1 shows a DCI format 0 for uplink scheduling.

TABLE 1

| Field | Bits | Comment |
| --- | --- | --- |
| Format | 1 | Uplink grant or downlink assignment |
| Hopping flag | 1 | Frequency hopping on/off |
| RB assignment | 7 | Resource block assigned for PUSCH |
| MCS | 5 | Modulation scheme, coding scheme, etc. |
| New Data Indicator | 1 | Toggled for each new transport block |
| TPC | 2 | Power control of PUSCH |
| Cyclic shift for DMRS | 3 | Cyclic shift of demodulation reference signal |
| CQI request | 1 | Request CQI feedback through PUSCH |
| RNTI/CRC | 16 | 16 bit RNTI implicitly encoded in CRC |
| Padding | 1 | Ensure format 0 matches format 1A in size |
| Total | 38 | — |

* MCS: Modulation and Coding Scheme
* TPC: Transmit Power Control
* RNTI: Radio Network Temporary Identifier
* CRC: Cyclic Redundancy Check The UE to which the PDCCH is transmitted is identified using the RNTI. For example, it is assumed that a PDCCH is CRC-masked with an RNTI "A" and uplink radio resource assignment information "B" (e.g., frequency location) and transmission format information "C" (e.g., a transmission block size, modulation, coding information or the like) are transmitted. In this case, UEs located in a cell monitor the PDCCH using RNTI information and a specific UE with RNTI "A" performs uplink transmission according to information about B and C obtained from the PDCCH.

Figure 6:
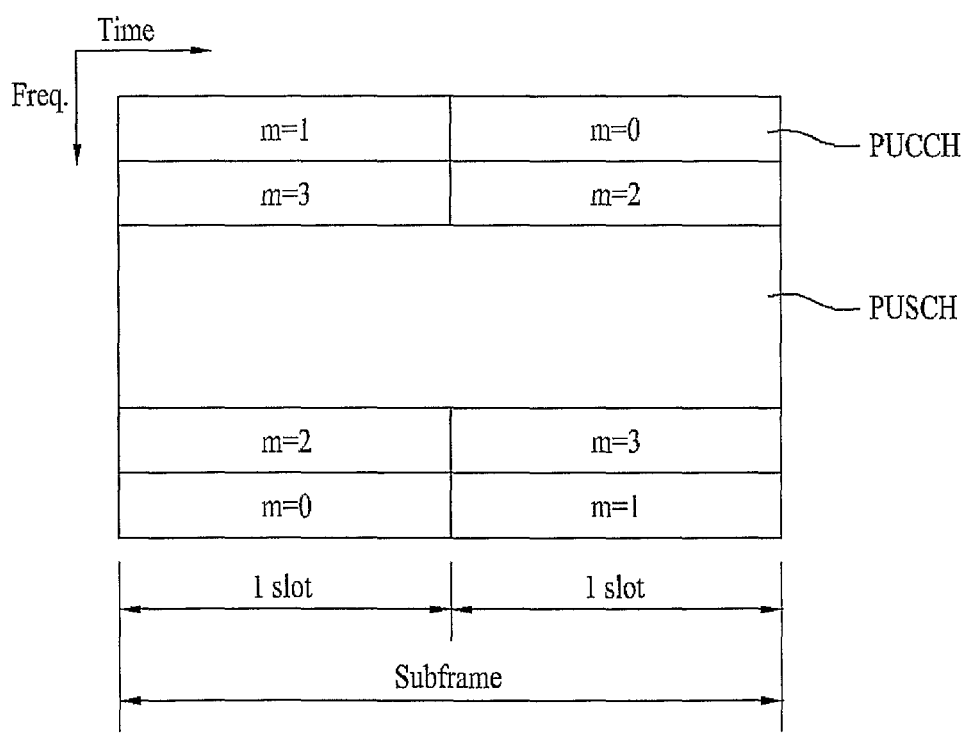
FIG. 6 is a diagram showing the structure of an uplink subframe.

FIG. 6 is a diagram showing the structure of an uplink subframe used in the LTE system.

Referring to FIG. 6, the uplink subframe includes a plurality of slots (e.g., 2). Each slot may include different numbers of SC-FDMA symbols according to the length of the CP. The uplink subframe is divided into a data region and a control region in a frequency domain. The data region includes a PUSCH and is used to transmit a data signal such as voice. The control region includes a PUCCH and is used to transmit uplink control information. The PUCCH includes RB pairs located at both ends of the data region on a frequency axis and hops between slots. The uplink control information includes a Scheduling Request (SR) for requesting uplink transfer resources, HARQ Acknowledgement (ACK)/Negative ACK (NACK) for downlink data, downlink channel (state) information and the like. The downlink channel (state) information includes a Precoding Matrix Indicator (PMI), a Rank Indicator (RI) and a Channel Quality Indicator (CQI).

HARQ

In a wireless communication system, if plural UEs having data to be transmitted in uplink/downlink are present, a BS selects which UE will transmit data in each Transmission Time Interval (TTI) (e.g., subframe). In particular, in a system operated using multiple carriers and the like, a BS selects UEs which will transmit data in uplink/downlink in each TTI and selects a frequency band used when each UE transmits the data.

In uplink, UEs transmit reference signals (or pilots) and a BS checks channel states of the UEs using the reference signals transmitted from the UEs and selects UEs which will transmit data in uplink in each unit frequency band. The BS informs the UEs of the selected results. That is, the base station transmits, to a UE which is scheduled to perform uplink transmission in a specific TTI, an uplink assignment message enabling the UE to transmit data using a specific frequency band. The uplink assignment message is also called UL grant. The UE transmits data in uplink in response to the uplink assignment message. The uplink assignment message includes information about a UE Identity (ID), RB assignment information, a payload or the like, and may further include an Incremental Redundancy (IR) version, a New Data Indication (NDI), and the like.

In the case where a synchronous non-adaptive HARQ scheme is applied, when a UE allotted a specific time retransmits data, a retransmission time is systematically decided in advance (e.g., after four subframes from a NACK reception time). Accordingly, a UL grant message transmitted from a BS to a UE is only transmitted upon initial transmission and retransmission is performed by an ACK/NACK signal. In contrast, in the case where an asynchronous HARQ scheme is applied, since a retransmission time is not decided in advance, a BS should transmit a retransmission request message to a UE. In addition, since frequency resources or MCS for retransmission is changed according to a transmission time, when a BS transmits a retransmission request message, a HARQ process index, an IR version and NDI information should be transmitted in addition to a UE ID, RB assignment information and a payload.

Figure 7:
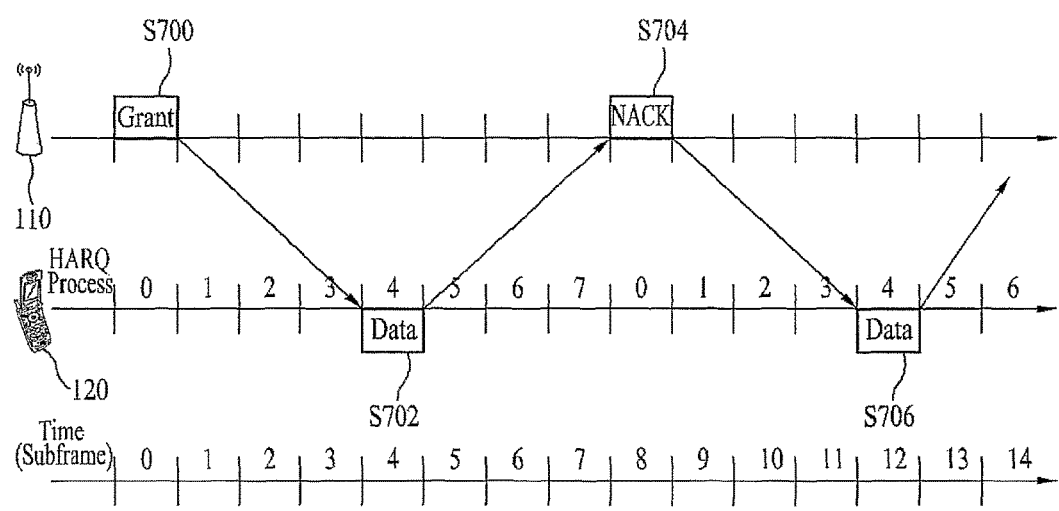
FIG. 7 is a diagram showing an Uplink Hybrid Automatic Repeat request (UL HARQ) operation in a Long Term Evolution (LTE) system.

FIG. 7 is a diagram showing an Uplink Hybrid Automatic Repeat request (UL HARQ) operation in a Long Term Evolution (LTE) system. In the LTE system, a UL HARQ scheme uses a synchronous non-adaptive HARQ scheme. When using 8-channel HARQ, HARQ process numbers are 0 to 7. One HARQ process operates per TTI (e.g., subframe). Referring to FIG. 7, a BS 110 transmits UL grant to a UE 120 through a PDCCH (S700). The UE 120 transmits uplink data to the BS 110 using an RB and MCS specified by the UL grant four subframes (e.g., subframe 4) after the UL grant is received (e.g., subframe 0) (S702). The BS 110 decodes the uplink data received from the UE 120 and then generates an ACK/NACK signal. If decoding of the uplink data fails, the BS 110 transmits a NACK signal to the UE 120 (704). The UE 120 retransmits the uplink data four subframes after a NACK is received (S706). The initial transmission and retransmission of the uplink data are performed by the same HARQ processor (e.g. HARQ process 4).

MIMO System Modeling

Figure 8:
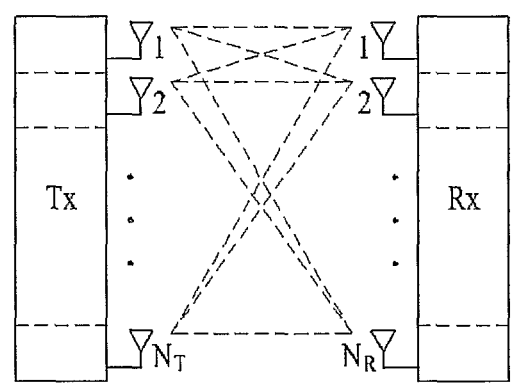
FIG. 8 is a diagram showing the configuration of a Multiple Input Multiple Output (MIMO) system.

FIG. 8 is a diagram showing the configuration of a typical MIMO wireless communication system.

Referring to FIG. 8, a simultaneous increase in Transmission (Tx) antennas of a transmitter to $N_T$ and in Reception (Rx) antennas of a receiver to $N_R$ increases a theoretical channel transmission capacity in proportion to the number of antennas, compared to use of a plurality of antennas at only one of the transmitter and the receiver. Therefore, transmission rate is increased and frequency efficiency is remarkably increased. Transmission rate increases up to the product of maximum transmission rate ($R_o$) and rate increase ($R_i$).

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was proved in the middle 1990's, many techniques have been actively studied to increase data rate in real implementation. Some of the techniques have already been reflected in various wireless communication standards including standards for 3$^{rd}$ Generation (3G) mobile communications, future-generation Wireless Local Area Network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

A communication scheme in the MIMO system will be described below using a mathematical model. It is assumed that there are $N_T$ Tx antennas and $N_R$ Rx antennas in the MIMO system.

Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{[Equation 2]}$$

A different transmit power may be applied to each piece of transmission information $s_1, s_2, \ldots, s_N$. Let the transmit power levels of the transmission information be denoted by $P_1, P_2, \ldots, P_{N_T}$, respectively. Then the transmit power-controlled transmission information $\hat{s}$ may be given as [Equation 3].

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

$\hat{s}$ may be expressed as a diagonal matrix P of transmit power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Let's consider a case where actual $N_T$ transmitted signals $x_1, x_2, \ldots, x_{N_T}$ are configured by applying a weight matrix W to the transmit power-controlled information vector $\hat{s}$.

The weight matrix W functions to appropriately distribute the transmission information to the Tx antennas according to transmission channel statuses, etc. These transmitted signals $x_1, x_2, \ldots, x_{N_T}$ are represented as a vector X, which may be determined as $$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

where $w_{ij}$ denotes a weight for a $j^{th}$ piece of information s transmitted through an $i^{th}$ Tx antenna and the weights are expressed as the matrix W. W is also referred to as a precoding matrix.

Given $N_R$ Rx antennas, signals received at the Rx antennas, $y_1, y_2, \ldots, y_{N_R}$ may be represented as the following vector.

$$y = [y_1, y_2, \ldots, y_{N_R}]^T \qquad \text{[Equation 6]}$$

When channels are modeled in the MIMO wireless communication system, they may be distinguished according to the indexes of Tx and Rx antennas. A channel between a $j^{th}$ Tx antenna and an $i^{th}$ Rx antenna is represented as $h_{ij}$. It is to be noted herein that the index of the Rx antenna precedes that of the Tx antenna in $h_{ij}$.

Figure 9:
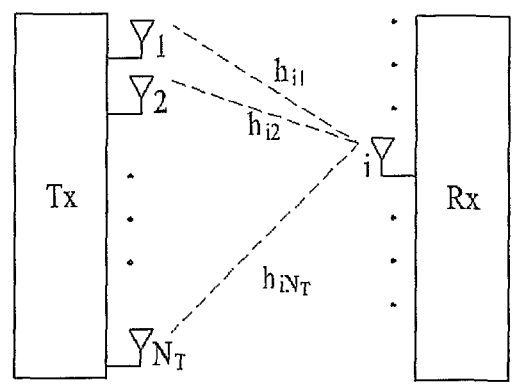
FIG. 9 is a diagram showing channels from $N_T$ Transmission (Tx) antennas to an $i^{th}$ Reception (Rx) antenna.

FIG. 9 is a diagram showing channels from $N_T$ TX antennas to an $i^{th}$ Rx antenna. Referring to FIG. 2, the channels from the $N_T$ Tx antennas to the $i^{th}$ Rx antenna may be expressed as [Equation 7].

$$h_i^T = [h_{i1}, h_{i2}, \ldots h_{iN_T}] \qquad \text{[Equation 7]}$$

Hence, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \qquad \text{[Equation 8]}$$

In the channel matrix H, the number of rows is equal to that of the Rx antennas, $N_R$ and the number of columns is equal to that of the Tx antennas, $N_T$. Thus, the channel matrix H is of size $N_R \times N_T$.

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \qquad \text{[Equation 9]}$$

From the above modeled equations, the received signal is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the rank of a matrix is defined as the minimum of the numbers of independent rows or columns. Accordingly, the rank of the matrix is not larger than the number of rows or columns. For example, the rank of the channel matrix H, rank(H) is limited as follows.

$$\text{rank}(H) \leq \min(N_T, N_R) \quad \text{[Equation 11]}$$

If the matrix is eigen value-decomposed, its rank may be defined as the number of non-zero eigen values. Similarly, in case of Singular Value Decomposition (SVD), the rank may be defined as the number of non-zero singular values. In a physical sense, therefore, the rank of a channel matrix is the maximum number of different pieces of information that can be transmitted on given channels.

Reference Signal (RS)

In a wireless communication system, since packets are transmitted through a radio channel, a signal may be distorted during transmission. In order to enable a reception side to correctly receive the distorted signal, distortion of the received signal should be corrected using channel information (or channel state information). In order to detect the channel information, a method of transmitting a signal which is known to both the transmission side and the reception side and detecting channel information using a distortion degree when the signal is received through a channel is mainly used. The signal known to both the transmission side and the reception side is referred to as a pilot signal or a reference signal (RS). When transmitting or receiving data using multiple antennas, the channel states between the transmission antennas and the reception antennas should be detected in order to correctly receive the signal. Accordingly, each transmission antenna has an individual RS.

In the wireless communication system, the RS may be divided into two signals according to use thereof: an RS used to acquire channel information (channel measurement RS) and an RS used to demodulate data (demodulation RS). For convenience, a downlink RS will be focused upon. Since the channel measurement RS is used to acquire downlink channel information, the channel measurement RS is transmitted over the entire band. In addition, even a UE which does not receive downlink data in a specific subframe should receive and measure the channel measurement RS. In addition, the channel measurement RS is used to measure handover or the like. Meanwhile, the demodulation RS indicates an RS which is sent through resource together when the BS transmits downlink data. When the UE receives the demodulation RS, a channel through which data is transmitted may be estimated and thus the data is demodulated.

Figure 10:
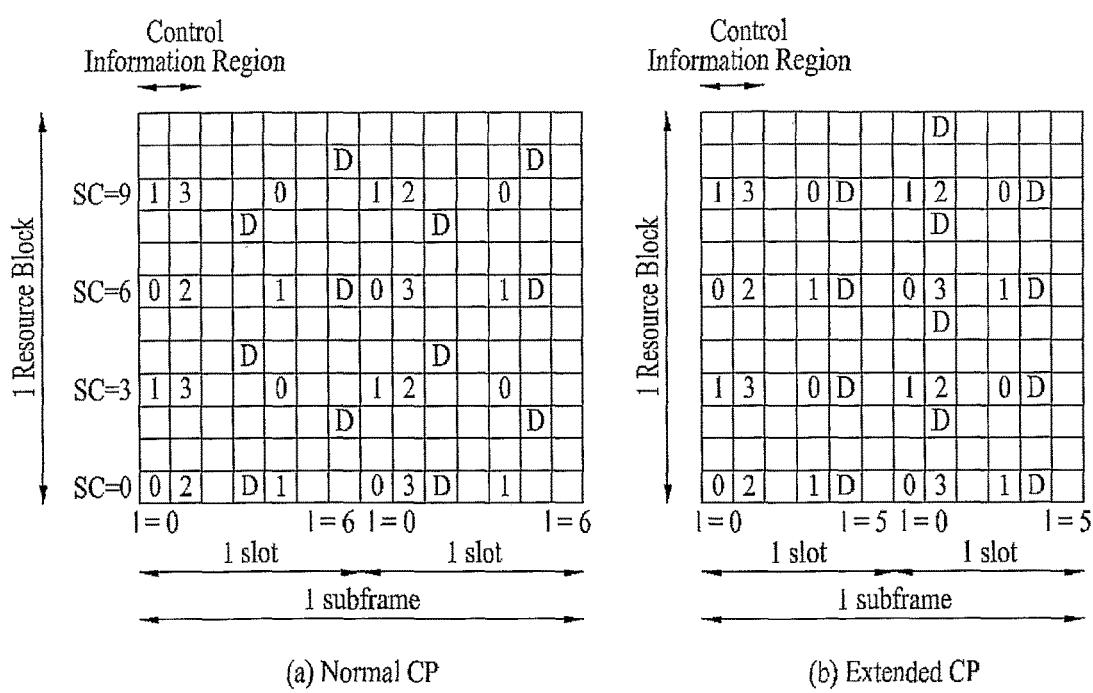
FIG. 10 is a diagram showing a Reference Signal (RS) pattern of an LTE system.

FIG. 10 is a diagram showing a Reference Signal (RS) pattern of an LTE system.

Referring to FIG. 10, in the LTE system, two kinds of downlink RSs are defined for a unicast service: a Common RS (CRS) (0~3) for acquiring channel state information and measuring handover or the like and a UE-specific RS (D) for data demodulation. The UE-specific RS is also called a dedicated RS. In the LTE system, the UE-specific RS is used only for data demodulation and the CRS is used both for channel information acquisition and data demodulation. The CRS is a cell-specific signal and is transmitted on a per subframe basis through the entire band. Since the LTE system supports a maximum of four transmission antennas in downlink, CRSs for a maximum of four antenna ports may be transmitted according to the number of transmission antennas of a BS. For example, if the number of transmission antennas of the BS is two, CRSs for antenna ports 0 and 1 are transmitted and, if the number of transmission antennas is four, CRSs for antenna ports 0 to 3 are transmitted. The respective CRSs for the antenna ports are multiplexed within RBs using a Frequency Division Multiplexing (FDM) method.

An LTE-A system, an evolved form of the LTE system, supports a maximum of eight transmission antennas in downlink. Accordingly, RSs for a maximum of eight transmission antennas should be supported. Since only RSs for a maximum of four antenna ports are defined as downlink RSs in the LTE system, if a BS has four to eight downlink transmission antennas in the LTE-A system, RSs for the antennas should be additionally defined. Channel measurement RSs and demodulation RSs should be designed as the RSs for a maximum of eight transmission antenna ports.

One important consideration in design of the LTE-A system is backward compatibility. That is, an LTE UE should operate well even in the LTE-A system and the LTE-A system should support the LTE UE. In terms of RS transmission, in a time-frequency domain in which CRSs defined in the LTE system are transmitted, RSs for a maximum of eight transmission antenna ports should be additionally defined. However, if an RS pattern for a maximum of eight transmission antennas is added to the entire band per subframe using the same method as the existing CRS of the LTE system, RS overhead is excessively increased in the LTE-A system. Accordingly, RSs newly designed in the LTE-A system are roughly divided into two types: a channel measurement RS for selecting an MCS, a Precoding Matrix Indicator (PMI) or the like (Channel State Information RS, Channel State Indication RS (CSI-RS), etc.) and a Data Demodulation RS (DM-RS). The CSI-RS is used for channel measurement, whereas the existing CRS is used for channel measurement or handover measurement. The CSI-RS may also be used for handover measurement. Since the CSI-RS is transmitted to acquire a channel state, the CSI-RS need not be transmitted per subframe, unlike the existing LTE CRS. Accordingly, the CSI-RS may be intermittently transmitted on a time axis in order to reduce overhead. For example, the CSI-RS may be periodically transmitted with a period which is an integral multiple of one subframe or may be transmitted with a specific transmission pattern. The transmission period or pattern of the CSI-RS may be configured by a BS. In order to measure the CSI-RS, a UE should determine information regarding a time-frequency location of the CSI-RS, CSI-RS sequence, and CSI-RS frequency shift for each antenna port of a cell to which the UE belongs. In contrast, the DM-RS is dedicatedly transmitted to a UE scheduled in a time-frequency domain for data demodulation. That is, the DM-RS for a specific UE is transmitted only in a region to which the UE is scheduled, that is, in a time-frequency domain in which data is received.

Cooperative Multipoint Transmission/Reception (CoMP) Method

Future systems, after the LTE-A system, will employ a method for enabling cooperation among several cells so as to improve performance. Such a mode is called Cooperative Multipoint Transmission/Reception (CoMP). The CoMP method indicates a method for enabling two or more BSs, access points or cells to cooperate with each other so as to communicate with a UE, in order to more smoothly perform communication between a specific UE and a BS, an access point or a cell. In the present invention, BS, access point and cell have the same meaning.

Figure 11:
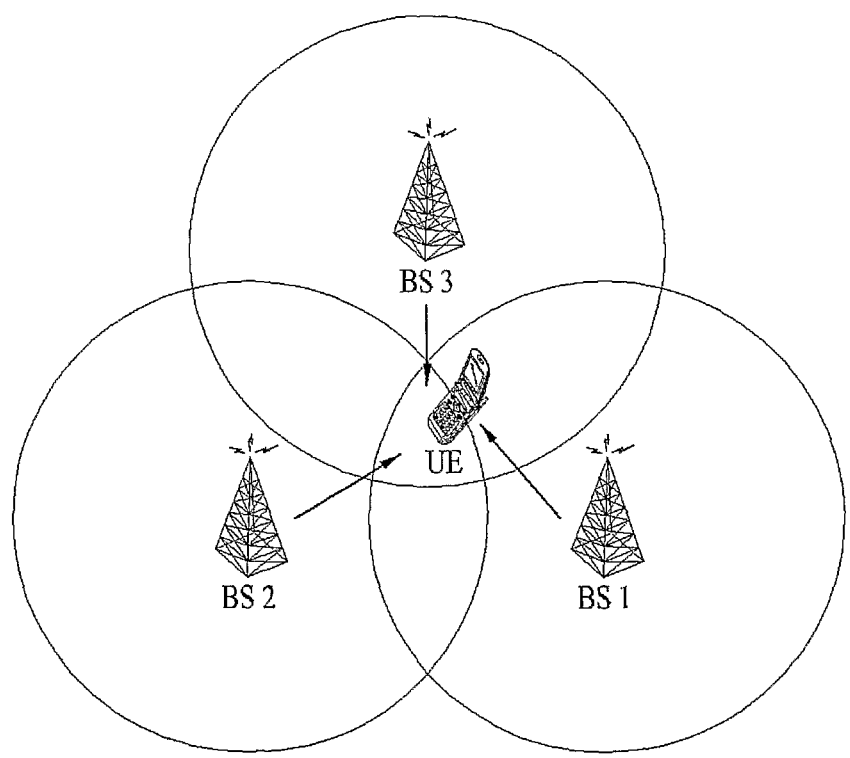
FIG. 11 is a diagram showing an example of performing Cooperative Multipoint Transmission/Reception (CoMP).

FIG. 11 is a diagram showing an example of performing CoMP. Referring to FIG. 11, a wireless communication system includes a plurality of base stations BS1, BS2 and BS3 for performing the CoMP and a UE. The plurality of base stations BS1, BS2 and BS3 for performing the CoMP may cooperate with each other so as to efficiently transmit data to the UE. The CoMP may be roughly divided into two types depending on whether or not data is transmitted from each base station for performing the CoMP: Joint Processing (CoMP Joint Processing (CoMP-JP) and Cooperative scheduling/beamforming (CoMP-CS)).

In the CoMP-JP, data transmitted to one UE is simultaneously transmitted from the base stations, which perform the CoMP, to the UE and the UE couples the signals from the base stations so as to improve reception performance. In contrast, in the CoMP-CS, data transmitted to one UE is transmitted through one base station at a certain instant and scheduling or beamforming is performed such that interference with another base station is minimized.

Carrier Aggregation (CA)

The LTE-A system uses carrier aggregation or bandwidth aggregation technology using an uplink/downlink bandwidth greater than that of a plurality of uplink/downlink frequency blocks in order to use a wider frequency band. Each frequency block is transmitted using a Component Carrier (CC). In the present specification, the CC may be a frequency block and/or a central carrier of a frequency block for carrier aggregation according to context.

Figure 12:
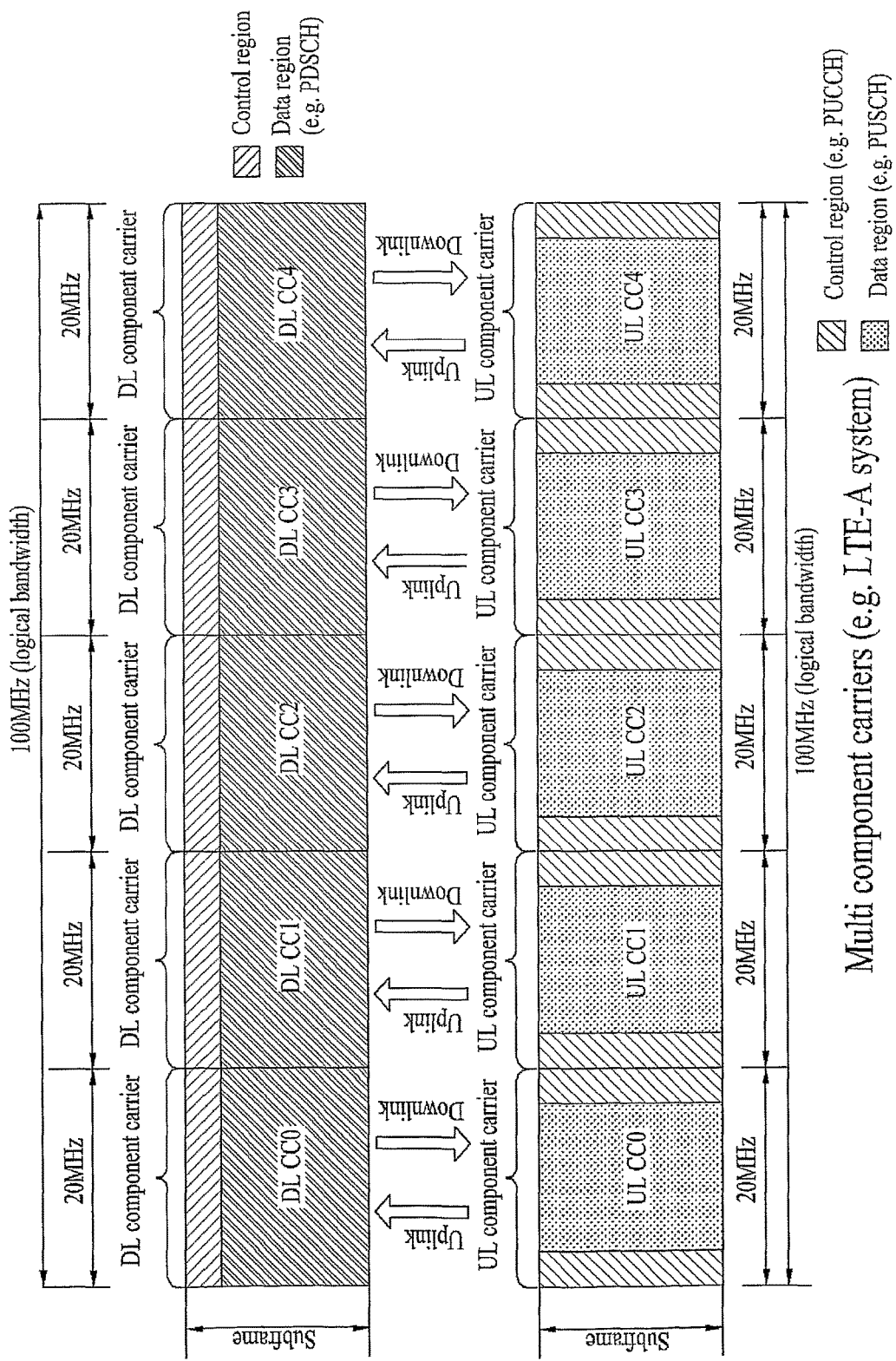
FIG. 12 is a diagram showing an example of performing communication given multiple component carriers.

FIG. 12 is a diagram showing an example of performing communication given multiple component carriers. FIG. 11 may correspond to a communication example of an LTE-A system.

Referring to FIG. 12, five 20-MHz CCs may be aggregated so as to support a bandwidth of 100 MHz in uplink/downlink. CCs may be contiguous or non-contiguous in a frequency domain. FIG. 11 shows the case where the bandwidth of an uplink CC and the bandwidth of a downlink CC are equal and symmetrical, for convenience. However, the bandwidths of the CCs may be independently set. In addition, asymmetrical carrier aggregation in which the number of uplink CCs and the number of downlink CCs are different is possible. The asymmetrical carrier aggregation may occur due to limited availability of frequency bands or may be artificially generated by network configuration. For example, although the entire band of the system includes N CCs, a frequency band in which a specific UE performs reception may be limited to M (<N) CCs. Various parameters for carrier aggregation may be set using a cell-specific method, a UE group-specific method or a UE-specific method.

Although FIG. 12 shows the case where uplink signals and downlink signals are transmitted through one-to-one mapped CCs, CCs over which signals are actually transmitted may be changed according to network configuration or signal type. For example, if a scheduling command is transmitted in downlink through a DL CCL1, data transmitted according to a scheduling command may be transmitted through another DL CC or UL CC. In addition, uplink control information may be transmitted in uplink through a specific UL CC regardless of whether or not mapping between CCs is performed. Similarly, downlink control information may be transmitted through a specific DL CC.

Figure 13:
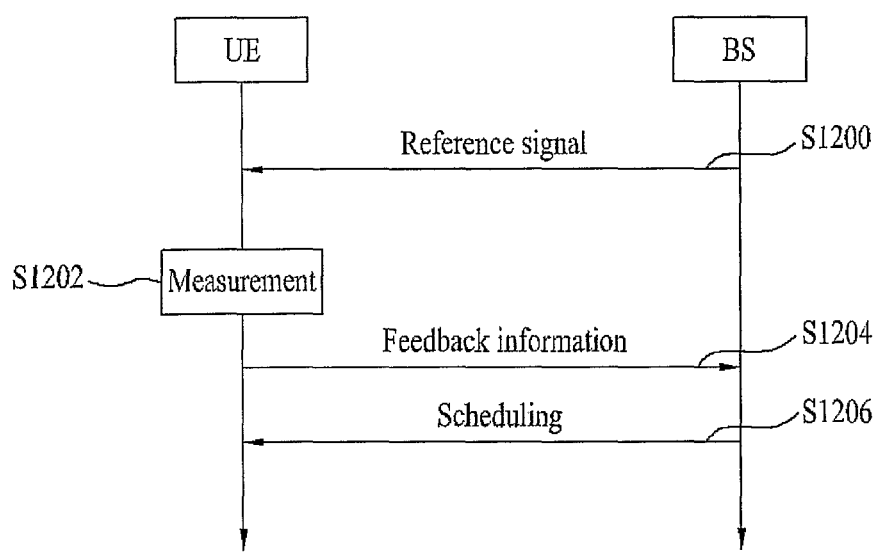
FIG. 13 is a diagram showing a downlink scheduling procedure.

FIG. 13 is a diagram showing a downlink scheduling procedure.

Referring to FIG. 13, a BS transmits an RS to a UE (S1200). The RS includes a channel measurement RS, for example, a CRS or a CSI-RS. The UE performs channel measurement using the RS received from the BS (S1202). Thereafter, the UE feeds back downlink channel information computed through channel measurement to the BS (S1204). The channel information fed back from the UE to the BS includes a covariance matrix of a channel, an interference and noise signal level (e.g., a signal-to-noise ratio (SNR), a signal-to-interference-plus-noise ratio (SINR), a carrier-to-interference-plus-noise ratio (CINR), or the like), channel direction information, a Precoding Matrix Indicator (PMI), a Rank Indicator (RI), a Channel Quality Indicator (CQI), a Received Signal Strength Indicator (RSSI), a Reference Signal Received Quality (RSRQ), and the like. Thereafter, the BS may perform downlink scheduling with respect to the UE using the downlink channel information received through the feedback information (S1206).

Coordinated Multi-Point (CoMP) scheme, (asymmetric) CA scheme, and Multiple Input Multiple Output (MIMO) scheme supporting 8 downlink (DL) transmission (Tx) antennas have recently been introduced to a Long Term Evolution-Advanced (LTE-A) system, such that an amount of uplink control information for supporting the aforementioned schemes is considerably increased. As an example, in the CoMP scheme, a user equipment (UE) that has to perform CoMP needs to measure Channel State Indication-Reference Signals (CSI-RSs) of both a serving cell for the UE and a neighbor cell co-operating with the serving cell, and has to provide a base station (BS) with a feedback result of the measured CSI-RSs. However, the feedback structure defined in LTE is unable to report a large amount of newly increased control information via uplink. Therefore, it is necessary to develop a new uplink control information feedback scheme.

In order to solve the above-mentioned problems, the aperiodic PUSCH-based feedback scheme of the conventional LTE can be used more effectively than the periodic PUCCH-based feedback scheme of the conventional LTE. The conventional LTE aperiodic PUSCH feedback scheme enables a base station (BS) to announce allocation information of a Resource Block (RB) at which feedback information will be received, modulation information, etc. through uplink grant control information in the same manner as in general uplink data transmission. Feedback information may be transmitted alone or together with data information through PUSCH.

The following Table 2 shows some parts of DCI Format 0 indicating aperiodic PUSCH feedback of the LTE. In the DCI Format 0, under the condition that a CQI request field is set to '1', the number of Physical Resource Blocks (PRBs) is '4' or less, and $I_{MCS}$ indicating an MCS index is set to '29', the UE only feeds back channel information (or channel state information (CSI)) of downlink (DL) through PUSCH.

If only the CQI request field is set to '1', the UE multiplexes the channel information with UL data and feeds back them through the PUSCH. If the CQI request field is set to '0', the UE does not perform PUSCH feedback but transmits-UL data only.

TABLE 2

|  | Bits | Aperiodic PUSCH Feedback |
|---|---|---|
| RB assignment | 7 | PRB <= 4 |
| MCS | 5 | $I_{MCS} = 29$ |
| CQI request | 1 | 1 |

Embodiment 1

Dynamic Feedback Mode Adaptation

The conventional LTE aperiodic PUSCH feedback scheme announces one feedback mode through RRC signaling, and switches PUSCH feedback transmission on or off through UL grant information. In case of the RRC signaling, a time delay of several tens of msec is required so that the feedback mode switching based on the RRC signaling is appropriate for simple communication environments or stable communication environments. However, in complex or rapidly fluctuating environments, the RRC-based feedback mode switching is unable to provide appropriate feedback information. In particular, considering CoMP and carrier aggregation technologies introduced to the LTE-A system, the conventional aperiodic PUSCH feedback scheme has limited ability to provide appropriate feedback information.

In the case of using CoMP as an example, if a UE's topographical location is changed, a set of neighbor cells helpful to the CoMP is changed, such that a feedback mode needs to be switched. In more detail, when a UE performs CoMP transmission and reception through 3 cells as shown in FIG. 11, the UE has to feed back channel information from the cells 1, 2 and 3 so as to perform the CoMP operation initiated from the cells 1, 2 and 3. However, provided that only cells 1 and 3 perform the CoMP operation due to change in UE position or channel environment variation, it is more efficient for the UE to feed back only channel information of the cells 1 and 3.

Therefore, a method for dynamically changing a feedback mode according to the communication environment or request is needed. For this purpose, a method for enabling the BS to inform the UE of configuration information of the corresponding feedback mode and mode switching information through PDCCH may be devised. In this case, although dynamic switching between feedback modes is possible, signaling overhead is unavoidably increased due to frequent transmission of feedback mode configuration information. On the other hand, basic information (e.g., measurement set, report set, etc.) for CoMP, basic information for carrier aggregation, and basic information for MIMO operations are designated by upper layer signaling (e.g., RRC signaling), and the designated basic information is semi-statically maintained. Therefore, in order to implement not only reduction in the amount of signaling overhead but also rapid feedback mode switching, the present invention proposes a two-stage feedback mode designating/switching scheme which designates basic information about several feedback modes by upper layer signaling and designates associated CSI content, format, etc. through physical channel signaling.

The term "feedback mode designation' for use in the embodiment of the present invention indicates allocation of feedback resources. The feedback mode indicates a format of CSI feedback to be fed back from the UE, scheme and content of the CSI feedback, and allocation of resources associated with the CSI feedback. In the present invention, the feedback mode may be simply used together with a feedback format.

Figure 14:
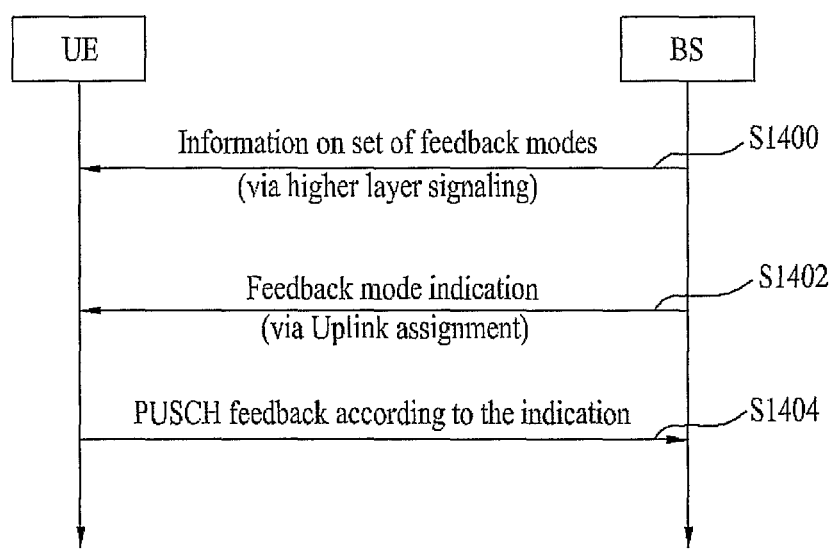
FIG. 14 is a flow chart showing an example of changing feedback mode according to an embodiment of the present invention.

FIG. 14 is a conceptual diagram illustrating a method for switching a feedback mode according to an embodiment of the present invention.

Referring to FIG. 14, the base station (BS) transmits information about several feedback modes (i.e., the set of feedback modes) to the UE through upper layer signaling. (e.g., RRC signaling) at step S1400. The information about the feedback mode set may include basic information (e.g., configuration information, identification (ID) information, mapping information, etc.). For example, the information about the feedback mode set may include the size of a used feedback mode set, and detailed information about individual feedback modes contained in the feedback mode set.

Nowadays, the LTE system includes a few channel feedback modes. For example, the aperiodic feedback transmission scheme of the LTE is classified into a No-PMI feedback mode, a single-PMI feedback mode, and a multiple-PMI feedback mode. In addition, the aperiodic feedback transmission mode is also classified into a wideband CQI mode, a selected subband CQI mode, and a configured subband CQI mode. The aforementioned feedback modes are selected to provide a balance between feedback overhead and the accuracy of channel information feedback. Therefore, when forming the feedback mode set using the conventional feedback modes, it is possible to perform dynamic switching of feedback modes in accordance with variation in uplink traffic load. That is, the present invention provides a means for effectively using downlink/uplink (DL/UL) resources, such that it is possible to perform dynamic switching between one scheme in which feedback accuracy is high and overhead is large and the other scheme in which feedback accuracy is low and overhead is small.

Table 3 shows one example of a feedback mode set for use in the CoMP scheme. Table 3 assumes that three cells perform the CoMP operation as shown in FIG. 11. If the number of CoMP cells is changed, the feedback mode set may be extended or reduced.

TABLE 3

| Indicator | Feedback Mode |
|---|---|
| 0 | Single cell feedback mode: cell 3 |
| 1 | CoMP-CS mode: cell 1, 3 |
| 2 | CoMP-CS mode: cell 2, 3 |
| 3 | CoMP-CS mode: cell 1, 2, 3 |
| 4 | CoMP-JP mode: cell 1, 3 |
| 5 | CoMP-JP mode: cell 2, 3 |
| 7 | CoMP-JP mode: cell 1, 2, 3 |

For convenience of description and better understanding of the present invention, although Table 3 exemplarily shows the feedback/format sets for use in the CoMP scheme, the feedback mode sets for use in the present invention are not limited to CoMP operations such as a CoMP mode, a CoMP set size, etc., and can be applied to other examples as necessary.

Meanwhile, under the condition that the BS performs scheduling for the UE, assuming that a single-cell operation and a CoMP operation are dynamically switched or JP (Joint Processing) and CS/CB (Cooperative Scheduling/Cooperative Beamforming) from among CoMP operations are dynamically switched, the UE has to feed back CSI information in such a manner that all cases (single-cell operation, JP, and CS/CB) are possible. When the UE receives a downlink (DL) service, feedback resources, content, format, etc. are changed according to cases, e.g., a case in which the UE receives the DL service using a single-cell scheme, a case in which the UE receives the UL service by switching both the single-cell operation scheme and JP and CS/CB schemes, a case in which the UE receives the UL service by switching the single-cell operation scheme and the JP scheme, and a case in which the UE receives the UL service by switching the single-cell operation scheme and the CS/CB scheme. Table 4 shows another example of a feedback mode set taking into consideration the aforementioned CoMP operation.

TABLE 4

| Indicator | Feedback Mode |
|---|---|
| 1 | CSI in which only single cell operation is considered |
| 2 | CSI in which single cell operation + JP + CS/CB (PCI (Phase Correction Information) required) are considered |
| 3 | CSI in which single cell operation + JP (PCI required) are considered. |
| 4 | CSI in which single cell operation + CS/CB are considered |

In addition, the feedback mode set according to the embodiment of the present invention may be adapted to indicate channel information about which CC from among several downlink CCs is fed back under a carrier aggregation (CA) situation. Table 5 exemplarily shows a feedback mode set for use in carrier aggregation (CA). Table 5 assumes that the number of DL CCs is 3. If the number of DL CCs is changed, the feedback mode set may be extended or reduced.

TABLE 5

| Indicator | Feedback Mode |
|---|---|
| 0 | component carrier 1 |
| 1 | component carrier 2 |
| 2 | component carrier 3 |
| 3 | component carrier 1, 2, 3 |

If the feedback mode set between the BS and the UE is decided, the BS may indicate a feedback mode within the predefined set through a UL grant message requesting aperiodic PUSCH feedback. In more detail, a variety of methods 1) to 4) for indicating a feedback mode through a UL grant message are proposed, and a detailed description thereof will hereinafter be given.

1) Explicit Signaling Method

A feedback mode indication field may be added to a PDCCH DCI format for providing UL grant. The UE can recognize a feedback mode from the corresponding field value upon receiving the UL grant. The value of the feedback mode indication field may include indication values shown in Tables 3 to 5 or offset values associated with the indication values.

2) Implicit Signaling Method Using Uplink Assigned RB Index

A feedback mode can be indicated/identified using index functions of UL RBs allocated for aperiodic PUSCH feedback transmission. That is, information indicating the feedback mode may be linked with an RB index for PUSCH feedback transmission. For example, provided that a start index of allocated UL RBs is denoted by 'N_start' and the size of a feedback mode set indicated by RRC signaling is denoted by 'S_set', a feedback mode can be indicated and identified using a function of N_start and S_set. Equation 12 shows an example for indicating/identifying a feedback mode.

[Equation 12]

$$\text{FeedbackModeIndicator} = \text{function}(RB \text{ index}) \quad (12\text{-}1)$$

$$\text{FeedbackModeIndicator} = \text{function}(N\_start) \quad (12\text{-}2)$$

$$\text{FeedbackModeIndicator} = \text{function}(N\_start, S\_set) \quad (12\text{-}3)$$

$$\text{FeedbackModeIndicator} = \text{function}(N\_start \bmod S\_set) \quad (12\text{-}4).$$

$$\text{FeedbackModeIndicator} = N\_start \bmod S\_set \quad (12\text{-}5)$$

In Equation 12, 'FeedbackModeIndicator' is an indication value indicating a feedback mode, and 'mod' is a modulo-operation.

Similarly, a feedback mode may be indicated by an index function of a specific RB (e.g., final RB) from among allocated UL RBs. In addition, the feedback mode may be linked with a resource unit of a control channel used for allocating resources for aperiodic PUSCH feedback transmission. For example, a feedback mode may be indicated using a specific CCE (e.g., a first or last CCE) from among CCEs used for transmitting a PDCCH for UL grant.

3) Implicit Signaling Method Using Uplink HARQ Process Index

A feedback mode can be indicated/identified using functions of UL HARQ process indexes (or HARQ process IDs) allocated for aperiodic PUSCH feedback transmission. That is, information indicating the feedback mode may be linked with a HARQ process for PUSCH feedback transmission. For example, provided that an index of allocated UL HARQ process is denoted by 'H' and the size of a feedback mode set indicated by RRC signaling is denoted by 'S_set', a feedback mode can be indicated and identified using a function of the H and S_set parameters. Equation 1e shows an example of indicating/identifying a feedback mode.

[Equation 13]

$$\text{FeedbackModeIndicator} = \text{function}(H) \quad (13\text{-}1)$$

$$\text{FeedbackModeIndicator} = \text{function}(H, S\_set) \quad (13\text{-}2)$$

$$\text{FeedbackModeIndicator} = \text{function}(H \bmod S\_set) \quad (13\text{-}3)$$

$$\text{FeedbackModeIndicator} = H \bmod S\_set \quad (13\text{-}4)$$

On the other hand, since the LTE system uses the synchronous HARQ scheme in UL, a UL HARQ process index is mapped one-to-one to a subframe index. Therefore, the aforementioned scheme may also be interpreted as a method for indicating a feedback mode as a function of a subframe index that performs aperiodic PUSCH feedback transmission. In addition, the aforementioned scheme may also be interpreted as a method for indicating a feedback mode as a function of a transmission subframe index of a PDCCH that requests the aperiodic PUSCH feedback transmission.

4) Implicit Signaling Method Using Subframe/Frame Index

As a modification of the aforementioned scheme (3), a feedback mode can be indicated by a subframe index, a frame index, or a System Frame Number (SFN) function to perform the aperiodic PUSCH feedback transmission. That is, indication information of a feedback mode may be linked with an index (e.g., a subframe index, a frame index, SFN index, etc.) of a time interval for PUSCH feedback transmission. In this case, tables for indicating individual feedback modes are established by performing the RRC signaling between the BS and the UE according to an index of a time interval for PUSCH feedback transmission.

Next, the UE transmits UL control information to the BS through PUSCH using the indicated feedback mode at step S1404. However, the UL control information transmitted via PUSCH feedback is not limited thereto, and the UL control information may further include Channel State Information (CSI), for example, a covariance matrix of a channel, a noise and interference signal level (e.g., SNR, SINR, CINR, etc.), channel direction information, PMI, RI, RR (Rank Request), CQI, RSSI, RSRQ, etc.

Embodiment 2

Feedback Format/Structure

As CoMP scheme, CA scheme, and MIMO scheme for supporting many more DL Tx antennas are introduced to the enhanced communication system such as LTE-A, the amount of UL control information for supporting the aforementioned schemes is considerably increased. In addition, owing to a variety of communication environments, feedback content, format, and an amount of feedback information to be fed back are changed with time. In the case of using CoMP as an example, in order to allow the UE to receive a DL service using the CoMP scheme, it is necessary for cooperative cells to recognize DL channel information from the cooperative cells to the corresponding UE. That is, in order to allow the UE to receive the CoMP service, it is necessary for DL channels of individual cells to be fed back. If the UE transmits feedback information about a DL channel to a serving BS, the serving BS shares the feedback information with a neighbor BS to cooperate with the serving BS. In association with a first case in which a single cell provides a service to the UE and a second case in which several cells collaboratively provide a service to the UE, feedback content, format, an amount of feedback information, etc. to be fed back from the UE are changed according to the first and second cases.

Next, the feedback format/structure according to the embodiment of the present invention will hereinafter be described with reference to the accompanying drawings. For convenience of description and better understanding of the present invention, although the drawings and explanation are disclosed on the basis of the CoMP, the CoMP-based explanation is disclosed for illustrative purposes only. For example, a BS (or cell) for use in the CoMP scheme may be replaced with a CC for carrier aggregation (CA), or may be replaced with an antenna for the MIMO scheme. In addition, the serving/neighbor BS (or cell) of the CoMP may be replaced with a primary/secondary CC or antenna.

The CSI feedback format/structure for multiple cells must be achieved on the basis of the feedback format/structure of a single cell. Information required for feedback of a single cell may include RI (Rank Index, Rank Indication), PMI (Precoding Matrix Index), CQI (Channel Quality Indication, Channel Quality Index, or Channel Quality Information), RR (Rank Request), etc. The RR (Rank Request) is a field that enables the UE to request the increase or reduction of rank from the BS, such that it is used to request UL resources for feedback. When the UE feeds back multi-cell CSI, it is necessary for the UE to basically feed back information about RI, PMI, CQI, RR, etc. on a per cell basis. According to cooperative methods of individual cells, i.e., according to a JP scheme or a CS/CB (Coordinated Scheduling/Coordinated Beamforming) scheme, feedback resource amount, feedback format/structure, content, etc. may be changed.

Figure 15:
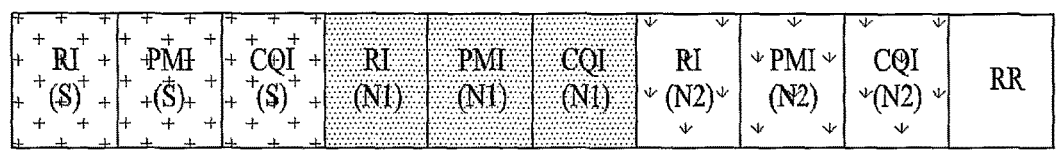
Figure 16:
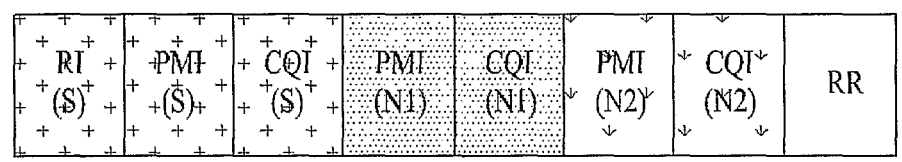

FIGS. 15 and 16 illustrate examples of the feedback format/structure for use in multiple cells (multi-cell).

In FIG. 15, CSI information of the serving cell and CSI information of the neighbor cell are sequentially combined. Information and order of cells that need to be actually fed back from the UE must be engaged between the UE and the BS. In the feedback format/structure shown in FIG. 15, RI is present in each reporting cell, and an operation for reporting each RI through CSI information of a neighbor cell is inefficient. Therefore, as shown in FIG. 16, it is preferable that the RI be transmitted within only the CSI feedback area of the serving cell. In this case, the RI transmitted through the serving-cell feedback may be commonly used by a neighbor cell 1 and a neighbor cell 2.

Figure 17:
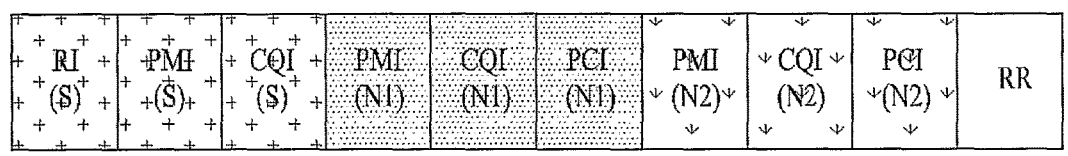

FIGS. 17 and 18 illustrate other examples of the feedback format/structure for multiple cells.

In CoMP, if several cells collaborate with one another, it is necessary for PCI (Phase Correction Indication or Phase Correction Information) to be additionally fed back, resulting in increased JP performance or throughput. In this case, since each neighbor cell requires phase information of the serving cell, the amount of feedback information is linearly increased in proportion to the number of cooperative cells. Accordingly, when feedback of a downlink (DL) channel from each CoMP cell to the UE is performed, PCI information for each cell has to be added to the feedback.

FIG. 17 shows an exemplary simple feedback format/structure when PCI is reported. In FIG. 17, PCI (N1) is phase correction information of the neighbor cell 1 of the serving cell, and PCI (N2) is phase correction information of the neighbor cell 2 of the serving cell. FIG. 18 shows an exemplary feedback format/structure in which only PCIs are collectively arranged. In the CS/CB-based CoMP mode, PCI need not be used at all. Thus, if the UE for receiving the CS/CB-based service continuously transmits the PCI, inefficient feedback resources may be unavoidably generated. As a result, PCI may be optionally included according to the CoMP mode.

Figure 19:
Figure 19:

FIG. 19 shows another example of the feedback format/structure.

In comparison between a first case in which the UE receives a service from a single cell and a second case in which the UE receives a service using the CoMP scheme, the second case has a higher possibility of changing the corresponding UE rank as compared to the first case. For example, the UE rank may be set to 2 when receiving the service using the CoMP scheme, whereas the UE rank is set to 1 when receiving the service from one cell. However, it is impossible for the conventional CSI feedback format/structure to represent the change of UE rank.

Therefore, when CSI feedback for multiple cells is performed, the present invention proposes a method for informing of the increase or reduction of rank or the changed rank through feedback information. For example, a delta RI field is defined in the feedback format/structure, such that the increase or reduction of rank or the changed rank can be directly notified. Preferably, the present invention proposes a method for reusing the RI field for the delta RI field during the CSI feedback for multiple cells. For example, some parts (for convenience of description, a corresponding part is denoted by a delta RI field) of the RI field may be adapted to indicate the delta rank (i.e., in CoMP, variation in rank or the increase or reduction of rank). In more detail, assuming that the RI field is composed of 3 bits, 2 bits may indicate a rank used when a service is received from a single cell and 1 bit may indicate a delta rank representing the increment/ decrement of rank. If the rank is set to 1, the delta rank may be adapted only to indicate the increase/reduction of rank or no-change of rank.

Table 6 shows exemplary signaling of the delta rank using the delta RI field.

TABLE 6

Delta RI is 1 bit:

If Delta RI = 1, then rank 1 is increased by 1
If else delta RI = 0, then rank is not changed
Delta RI is 2 bits:

If delta RI = 00, then rank is not changed
Else if delta RI = 01, then rank is increased by 1
Else if delta RI = 10, then rank 1 is reduced by 1
Else if delta RI = 11, reserved When the UE feeds back CSI for multiple cells, feedback information can be generally classified into feedback information about the serving cell and CSI feedback information about a CoMP set (i.e., a neighbor cell). CSI information used when only a single-cell operation is considered and CSI information used when the CoMP operation is considered need to be added to the feedback information of the serving cell. That is, an optimum CQI/PMI during the single-cell operation and an optimum CQI/PMI of the serving cell during the CoMP operation need to be additionally fed back.

As described above, the UE rank may be changed during the CoMP operation. If the UE rank is changed, a PMI codebook fed back from the UE is also changed. That is, if the rank is 1, the UE has to report a specific PMI that is most appropriate among the Rank 1 PMI codebook. If the rank is 2, the UE has to report a specific PMI that is most appropriate among the Rank 2 PMI codebook. Therefore, if the rank is changed during the CoMP operation, the UE must feed back information on the changed rank while simultaneously selecting a PMI codebook in accordance with the changed rank, so that the UE has to report the most appropriate PMI within the selected PMI codebook. In addition, a CQI used when the corresponding PMI is used must also be fed back.

For example, it is assumed that, under the condition that the rank is set to 1 at the single-cell operation, the rank is increased to 2 under the CoMP-based service. In this case, CSI feedback information about the serving cell must report the most appropriate PMI from among the Rank 1 codebook in consideration of the single cell operation, and must also report the most appropriate PMI from among the Rank 2 codebook in consideration of the CoMP operation. In addition, a PMI (in the aforementioned example, Rank 2 Codebook) of a cooperating neighbor cell must be selected from among the PMI codebook in accordance with the changed rank, and the selected PMI must be fed back.

Referring to FIG. 19, PMI(SC) indicates a PMI of the serving cell under the assumption of the single cell operation, and PMI(MC) indicates a PMI of the serving cell under the assumption of the CoMP operation. For the efficiency of feedback, when the UE selects PMI(MC), the PMI(MC) must be selected from among objects including PMI(SC). That is, PMI(MC) must be selected from among PMIs, each of which includes columns (vectors) of the PMI (SC). The aforementioned PMI selection method is a PMI restriction method to reduce the number of signaling bits. That is, if the rank is increased during a multi-cell based service, the added vector space caused by the multi-cell operation must be orthogonal to a vector space formed under the conventional single-cell operation. In addition, only the added vector space is fed back. That is, for PMI(MC), only changed/added part from the PMI(SC) is fed back. For example, PMI of Rank=1 and PMI of Rank=2 for use in the current LTE system will hereinafter be described in detail. Table 7 illustrates a downlink (DL) codebook defined in the LTE system.

TABLE 7

| | Number of layers (Rank) | |
|---|---|---|
| Codebook index | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | |

In the single cell operation, if Rank is set to 1 and PMI(SC) is set to 0 (codebook index: 0) and Rank is changed to 2 by the CoMP operation, a PMI including a vector in which the codebook index is 0 is selected as PMI(MC) from among the Rank 2 codebook. In this example, the codebook index of the PMI(MC) is 1. Therefore, signaling may be carried out using only one bit. Taking into consideration the scheme of the present invention, selecting the PMI(MC), PMI(MC) is directly decided by PMI(SC), such that the BS can recognize PMI(MC) without receiving the feedback result of the PMI(MC) from the UE.

Changing the PMI during the CoMP mode indicates that a CQI of the corresponding UE is changed. Therefore, information about the changed CQI must also be fed back. It is assumed that a CQI of the serving cell under the single-cell operation is denoted by CQI(SC) and a CQI of the serving cell under the CoMP mode is denoted by CQI(MC). CQI(MC) indicates a CQI when PMI(MC) is used. A delta CQI may be denoted by a variation width indicating how much the CQI(MC) is changed as compared to CQI(SC). In addition, when CQI of the neighbor cell is fed back from the UE, the UE may configure and transmit CQI information in such a manner that the serving cell can calculate/estimate CQI(MC). Therefore, the UE need not explicitly feed back the delta CQI.

The aforementioned scheme may also be used as a feedback scheme for simultaneously supporting SU-MIMO and MU-MIMO in a single-cell operation. When switching from SU-MIMO to MI-MIMO or switching from MU-MIMO to SU-MIMO, the UE rank is changed, such that the aforementioned scheme can be used to switch between SU-MIMO and MI-MIMO.

Figure 20:
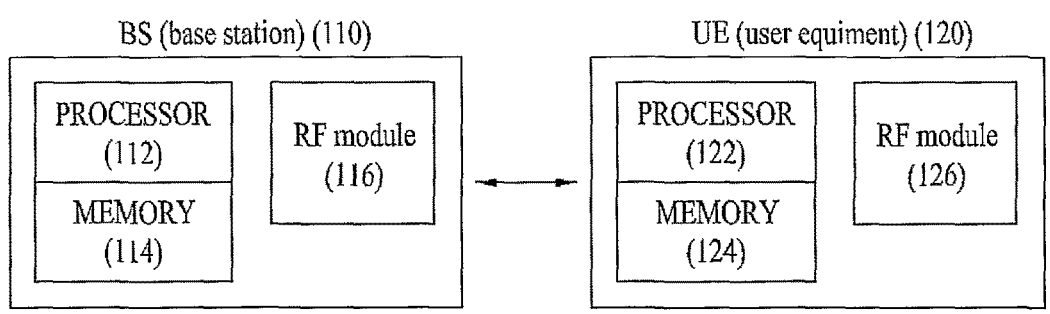
FIG. 20 is a block diagram showing a base station and a UE applicable to the present invention.

FIG. 20 is a block diagram showing a BS and a UE applicable to the present invention.

Referring to FIG. 20, a wireless communication system includes a BS 110 and a UE 120. In downlink, a transmitter is a portion of the BS 110 and a receiver is a portion of the UE 120. In uplink, a transmitter is a portion of the UE 120 and a receiver is a portion of the BS 110. The BS 110 includes a processor 112, a memory 114, and a Radio Frequency (RF) module 116. The processor 112 may be configured to implement procedures and/or methods proposed by the present invention. The memory 114 is connected to the processor 112 so as to store a variety of information associated with the operation of the processor 112. The RF module 116 is connected to the processor 112 so as to transmit and/or receive an RF signal. The UE 120 includes a processor 122, a memory 124 and an RF module 126. The processor 112 may be configured to implement procedures and/or methods proposed by the present invention. The memory 124 is connected to the processor 122 so as to store a variety of information associated with the operation of the processor 122. The RF module 126 is connected to the processor 122 so as to transmit and/or receive an RF signal. The BS 110 and/or the UE 120 may have a single antenna or multiple antennas. Although not shown, the UE 120 may further include at least one of a power management module, a battery, a display, a keypad, a SIM card (optional), a speaker and a microphone.

The above-described embodiments are proposed by combining constituent components and characteristics of the present invention according to a predetermined format. The individual constituent components or characteristics should be considered optional on the condition that there is no additional remark. If required, the individual constituent components or characteristics need not be combined with other components or characteristics. Also, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. In addition, embodiments may be configured by combining claims which do not have an explicit relationship or new claims may be added by amendment after application.

The above-mentioned embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary. In other words, it will be obvious to those skilled in the art that various operations for enabling the base station to communicate with the mobile station in a network composed of several network nodes including the base station will be conducted by the base station or other network nodes other than the base station. The term "Base Station" may be replaced with fixed station, Node-B, eNode-B (eNB), or access point as necessary. The term "mobile station" may also be replaced with user equipment (UE), mobile station (MS) or mobile subscriber station (MSS) as necessary.

The following embodiments of the present invention can be implemented by a variety of means, for example, hardware, firmware, software, or a combination thereof. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. The software code may be stored in a memory unit so as to be driven by a processor. The memory unit is located inside or outside of the processor so as to communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless communication system. In detail, the present invention is applicable to a method and apparatus for transmitting an uplink control signal in a wireless communication system.

The invention claimed is:

1. A method of transmitting aperiodic channel status information (CSI) at a user equipment (UE) through a physical uplink shared channel (PUSCH) in a wireless communication system, the method comprising:
   receiving a physical downlink control channel (PDCCH) for scheduling the PUSCH, the PDCCH including 2-bit level indicator for requesting aperiodic CSi report; and
   transmitting aperiodic CSI for at least one of a plurality of component carriers through the PUSCH scheduled by the PDCCH, the at least one of the plurality of component carriers being indicated by the 2-bit level indicator in the PDCCH, wherein the plurality of component carriers includes component carrier sets for the aperiodic CSI report, the component carrier sets for the aperiodic CSI report are configured by using radio resource control (RRC) configuration information, and each of the component carrier sets for the aperiodic CSI report includes one or more component carriers.

2. The method of claim 1, wherein a value of the 2-bit level indicator indicates one of the component carrier sets for which the aperiodic CSI report is triggered.

3. The method of claim 1, wherein at least one of the component carrier sets includes two or more component carriers.

4. The method of claim 1, wherein the at least one of the plurality of component carriers belongs to a component carrier set indicated by the 2-bit level indicator in the PDCCH among the component carrier sets.

5. The method of claim 1, wherein the PDCCH includes resource block (RB) assignment information and a hybrid automatic repeat and request (IhARQ) process index for the PUSCH.

6. A method of receiving aperiodic channel status information (CSI) at a base station (BS) through a physical uplink shared channel (PUSCH) in a wireless communication system, the method comprising:
   transmitting a physical downlink control channel (PDCCH) for scheduling the PUSCII, the PDCCH including 2-bit level indicator for requesting aperiodic CSI report; and receiving aperiodic CST for at least one of a plurality of component carriers through the PUSCH scheduled by the PDCCH, the at least one of the plurality of component carriers being indicated by the 2-bit level indicator in the PDCCH, wherein the plurality of component carriers includes component carrier sets for the aperiodic CST report, the component carrier sets for the aperiodic CSI report are configured by using radio resource control (RRC) configuration information, and each of the component carrier sets for the aperiodic CSI report includes one or more component carriers.

7. The method of claim 6, wherein a value of the 2-bit level indicator indicates one of the component carrier sets for which the aperiodic CSI report is triggered.

8. The method of claim 6, wherein at least one of the component carrier sets includes two or more component carriers.

9. The method of claim 6, wherein the at least one of the plurality of component carriers belongs to a component carrier set indicated by the 2-bit level indicator in the PDCCH among the component carrier sets.

10. The method of claim 6, wherein the PDCCII includes resource block (RB) assignment information and a hybrid automatic repeat and request (HARQ) process index for the PUSCH.

11. A user equipment (UE) configured to transmit aperiodic channel status information (CSI) through a physical uplink shared channel (PUSCH) in a wireless communication system, the UE comprising:
 a radio frequency (RE) unit; and
 a processor connects to the radio frequency (RE) unit, wherein the processor is configured to:
 receive a physical downlink control channel (PDCCH) for scheduling the PUSCH, the PDCCH including 2-bit level indicator for requesting aperiodic CSI report, and
 transmit aperiodic CSI for at least one of a plurality of component carriers through the PUSCH scheduled by the PDC CH, the at least one of the plurality of component carriers being indicated by the 2-bit level indicator in the PDCC-I, wherein the plurality of component carriers includes component carrier sets for the aperiodic CSI report, the component carrier sets for the aperiodic CSI report are configured by using radio resource control (RRC) configuration information, and each of the component carrier sets for the aperiodic CSI report includes one or more component carriers.

12. The UE of claim 11, wherein a value of the 2-bit level indicator indicates one of the component carrier sets for which the aperiodic CSI report is triggered.

13. The UE of claim 11, wherein at least one of the component carrier sets includes two or more component carriers.

14. The UE of claim 11, wherein the at least one of the plurality of component carriers belongs to a component carrier set indicated by the 2-bit level indicator in the PDCCH among the component carrier sets.

15. The UE of claim 11, wherein the PDCCH includes resource block (RB) assignment information and a hybrid automatic repeat and request (1-IARQ) process index for the PUSCH.

16. A base station (BS) configured to receive aperiodic channel status information (CSI) through a physical uplink shared channel (PUSCH) in a wireless communication system, the BS comprising:
 a radio frequency (RF) unit; and
 a processor connects to the radio frequency (RF) unit, wherein the processor is configured to:
 transmit a physical downlink control channel (PDCCH) for scheduling the PUSC—, the PDCCH including 2-bit level indicator for requesting aperiodic CSI report, and
 receive aperiodic CSI for at least one of a plurality of component carriers through the PUSCH scheduled by the PDCCH, the at least one of the plurality of component carriers being indicated by the 2-bit level indicator in the PDCC-I, wherein the plurality of component carriers includes component carrier sets for the aperiodic CSI report, the component carrier sets for the aperiodic CSI report are configured by using radio resource control (RRC) configuration information, and each of the component carrier sets for the aperiodic CSi report includes one or more component carriers.

17. The BS of claim 16, wherein a value of the 2-bit level indicator indicates one of the component carrier sets for which the aperiodic CSI report is triggered.

18. The BS of claim 16, wherein at least one of the component carrier sets includes two or more component carriers.

19. The BS of claim 16, wherein the at least one of the plurality of component carriers belongs to a component carrier set indicated by the 2-bit level indicator in the PDCCH among the component carrier sets.

20. The BS of claim 16, wherein the PDCCH includes resource block (RB) assignment information and a hybrid automatic repeat and request (1-ARQ) process index for the PUSCH.

* * * * *